(12) United States Patent
Meng et al.

(10) Patent No.: US 10,511,184 B2
(45) Date of Patent: Dec. 17, 2019

(54) CHARGING CONTROL METHOD AND APPARATUS FOR WEARABLE ELECTRONIC DEVICE, AND SMART WATCH

(71) Applicant: Goertek Inc., Weifang (CN)

(72) Inventors: Xin Meng, Weifang (CN); Zenan Hou, Weifang (CN); Xinghua Li, Weifang (CN)

(73) Assignee: Goertek Inc., Weifang (CN)

( * ) Notice: Subject to any disclaimer, the term of this patent is extended or adjusted under 35 U.S.C. 154(b) by 160 days.

(21) Appl. No.: 15/540,973

(22) PCT Filed: Jul. 14, 2016

(86) PCT No.: PCT/CN2016/089983
§ 371 (c)(1),
(2) Date: Jun. 29, 2017

(87) PCT Pub. No.: WO2017/096906
PCT Pub. Date: Jun. 15, 2017

(65) Prior Publication Data
US 2017/0366035 A1    Dec. 21, 2017

(30) Foreign Application Priority Data

Dec. 9, 2015    (CN) .......................... 2015 1 0907791

(51) Int. Cl.
*H02J 7/00*    (2006.01)
*H02J 7/04*    (2006.01)
(Continued)

(52) U.S. Cl.
CPC .............. *H02J 7/047* (2013.01); *G04G 19/06* (2013.01); *H01M 10/0525* (2013.01);
(Continued)

(58) Field of Classification Search
CPC .......... H02J 7/047; H02J 50/10; H02J 7/0027; H02J 7/0029
(Continued)

(56) References Cited

U.S. PATENT DOCUMENTS 6,100,671 A     8/2000 Kanesaka
9,678,547 B1 *  6/2017 Mirov ....................... G06F 1/24
(Continued)

FOREIGN PATENT DOCUMENTS

CN    103135440 A    6/2013
CN    103812199 A    5/2014
(Continued)

OTHER PUBLICATIONS

Japan Patent Office, Notification of Reasons for Refusal for Application No. 2017-565773, dated Sep. 19, 2018.
(Continued)

*Primary Examiner* — Suchin Parihar
(74) *Attorney, Agent, or Firm* — LKGlobal | Lorenz & Kopf, LLP

(57) ABSTRACT

This Application pertains to a charging control method including: setting a temperature range when a wearable electronic device is being charged according to a user demand; when the charging starts, turning on a wirelessly receiving coil of the wearable electronic device and using it to generate a charging current for charging the wearable electronic device; when it is monitored that a value of the charging current of the wearable electronic device rises to a preset constant-current charging current value, acquiring in real time a temperature value of the wearable electronic device; and judging whether the temperature value is within the temperature range; and if yes, maintaining the present value of the charging current of the wearable electronic device; and if not, changing the value of the charging current (Continued)

of the wearable electronic device, so that the temperature value of the wearable electronic device is within the temperature range.

20 Claims, 4 Drawing Sheets

(51) Int. Cl.
  *H01M 10/44*   (2006.01)
  *G04G 19/06*   (2006.01)
  *H01M 10/0525*  (2010.01)
  *H01M 10/42*   (2006.01)
  *H02J 7/02*   (2016.01)
  *H02J 50/10*   (2016.01)
  *G04G 9/00*   (2006.01)

(52) U.S. Cl.
  CPC ....... *H01M 10/4257* (2013.01); *H01M 10/44* (2013.01); *H01M 10/443* (2013.01); *H01M 10/448* (2013.01); *H02J 7/0027* (2013.01); *H02J 7/0029* (2013.01); *H02J 7/0042* (2013.01); *H02J 7/0091* (2013.01); *H02J 7/025* (2013.01); *H02J 50/10* (2016.02); *G04G 9/007* (2013.01); *H01M 2220/30* (2013.01)

(58) Field of Classification Search
  USPC .......................................... 320/114
  See application file for complete search history.

(56) References Cited

U.S. PATENT DOCUMENTS

| | | | |
|---|---|---|---|
| 9,893,556 B2 | 2/2018 | Iwasaki et al. | |
| 10,002,709 B2 | 6/2018 | Hu | |
| 10,018,616 B2 | 7/2018 | Furukawa | |
| 10,216,236 B1 * | 2/2019 | Ashwood | G06F 1/206 |
| 2009/0085527 A1 | 4/2009 | Odaohhara | |
| 2014/0070761 A1 | 3/2014 | Labbe et al. | |
| 2014/0177399 A1 | 6/2014 | Teng et al. | |
| 2015/0033880 A1 | 2/2015 | Furukawa | |
| 2016/0126771 A1 * | 5/2016 | Aghassian | H02J 7/025 320/108 |

FOREIGN PATENT DOCUMENTS

| | | |
|---|---|---|
| CN | 103855772 A | 6/2014 |
| CN | 103872732 A | 6/2014 |
| CN | 104052138 A | 9/2014 |
| CN | 104901436 A | 9/2015 |
| CN | 105552988 A | 5/2016 |
| EP | 0908960 A2 | 4/1999 |
| EP | 2705877 A1 | 3/2014 |
| JP | 2005245078 A | 9/2005 |
| JP | 20099165329 A | 7/2009 |
| WO | 2009031639 A1 | 3/2009 |
| WO | 2015184098 A1 | 12/2015 |

OTHER PUBLICATIONS

International Bureau of WIPO, International Search Report and Written Opinion in Application No. PCT/CN2016/089983, dated Oct. 18, 2016.

The State Intellectual Property Office of the People's Republic of China, Office Action in Chinese Patent Application No. 201510907791.0 dated Sep. 26, 2017.

European Patent Office, Communication in European Patent Application No. 16872105.8-1108 dated May 11, 2018.

* cited by examiner ized organization that promotes wireless charging technology, and possesses two main characteristics of convenience and versatility. The Qi Standard employs "electromagnetic induction technology". The charging efficiency of the wireless charging method on the basis of the "electromagnetic induction technology" has a positive correlation with the power of the devices. Wearable electronic devices (for example smart watches), because of the generally relatively small battery capacities limited by device sizes, have small powers, which results in that when smart watches are wirelessly charged, the charging efficiency is relatively low. The low charging efficiency results in the following problem when the wireless charging technology is applied in smart watches: the charging temperature is too high, and heat is generated when charging.

CHARGING CONTROL METHOD AND APPARATUS FOR WEARABLE ELECTRONIC DEVICE, AND SMART WATCH

CROSS-REFERENCE TO RELATED APPLICATION

This application is a U.S. National-Stage entry under 35 U.S.C. § 371 based on International Application No. PCT/CN2016/089983, filed Jul. 14, 2016, which was published under PCT Article 21(2) and which claims priority to Chinese Patent Application No. 201510907791.0, filed Dec. 9, 2015, which are all hereby incorporated in their entirety by reference.

TECHNICAL FIELD

This Application pertains to the technical field of wearable electronic devices, and specifically to a charging control method and apparatus for a wearable electronic device, and a smart watch.

BACKGROUND

The wireless charging technology in the field of consumer electronics is mainly on the basis of the WPC (Qi) Standard. Qi is a "wireless charging" standard presented by Wireless Power Consortium (for short, WPC), which is the globally first standardization organization that promotes wireless charging technology, and possesses two main characteristics of convenience and versatility. The Qi Standard employs "electromagnetic induction technology". The charging efficiency of the wireless charging method on the basis of the "electromagnetic induction technology" has a positive correlation with the power of the devices. Wearable electronic devices (for example smart watches), because of the generally relatively small battery capacities limited by device sizes, have small powers, which results in that when smart watches are wirelessly charged, the charging efficiency is relatively low. The low charging efficiency results in the following problem when the wireless charging technology is applied in smart watches: the charging temperature is too high, and heat is generated when charging.

On one hand, too high temperature will affect the battery life, and on the other hand, because wearable devices directly contact with skin, too high temperature scalds skin, or makes the wearer uncomfortable, which causes poor user experience, and thus reduces the user stickiness to the products.

A traditional solution regarding the problem, such as employing techniques of heat conduction, heat dissipation and so on, results in increasing cost and is hard to spread. Another traditional solution, such as temporarily stopping the charging when the charging temperature is too high, will cause the problem of too long charging duration, prolonging the overall charging duration, which also results in poor user experience. In addition, other objects, desirable features and characteristics will become apparent from the subsequent summary and detailed description, and the appended claims, taken in conjunction with the accompanying drawings and this background.

SUMMARY

In order to solve the above problems, this Application provides a charging control method and apparatus for a wearable electronic device, and a smart watch, which solves the problem that in the process of wireless charging of wearable devices, heating results in too high temperature, and also avoids the problems of too long charging duration and high cost caused by traditional means for reducing the temperature.

According to an aspect of this application, there is provided a charging control method for a wearable electronic device, the method including, but not limited to:

setting a temperature range when the wearable electronic device is being charged according to a user demand;

when the charging starts, turning on a wirelessly receiving coil of the wearable electronic device, and using the wirelessly receiving coil to generate a charging current for charging the wearable electronic device;

when it is monitored that a value of the charging current of the wearable electronic device rises to a set constant-current charging current value, acquiring in real time a temperature value of the wearable electronic device; and judging whether the temperature value is within the temperature range; and if yes, maintaining the present value of the charging current of the wearable electronic device; and if not, changing the value of the charging current of the wearable electronic device, and thus changing the temperature value of the wearable electronic device, so that the temperature value of the wearable electronic device is within the temperature range.

According to another aspect of this application, there is provided a charging control apparatus for a wearable electronic device, the apparatus including, but not limited to:

a temperature range setting unit, for setting a temperature range when the wearable electronic device is being charged according to a user demand;

a coil controlling unit, for when the charging starts, turning on a wirelessly receiving coil of the wearable electronic device, and using the wirelessly receiving coil to generate a charging current for charging the wearable electronic device;

a temperature monitoring unit, for when it is monitored that a value of the charging current of the wearable electronic device rises to a set constant-current charging current value, acquiring in real time a temperature value of the wearable electronic device;

a temperature judging unit, for judging whether the temperature value is within the temperature range; and a current controlling unit, for according to a judgment result of the temperature judging unit, maintaining the present value of the charging current of the wearable electronic device; or, changing the value of the charging current of the wearable electronic device, and thus changing the temperature value of the wearable electronic device, so that the temperature value of the wearable electronic device is within the temperature range.

According to still another aspect of this Application, there is provided a smart watch, wherein the smart watch is provided with the above charging control apparatus for a wearable electronic device, and the apparatus for controlling charging causes a temperature value of the smart watch when being charged in a wireless mode to be within a set temperature range.

The advantageous effects of the technical solutions of this application are: the technical solutions of the embodiments of this application preset the temperature range, and when the value of the charging current of the wearable electronic device rises to the preset constant-current charging current value, in real time monitor the temperature of the wearable electronic device, and according to the difference of the judgment results of the temperature value, employ different controlling measures. In especial when the temperature value of the wearable device exceeds the temperature range, the solution realizes the cooling by reducing the charging current. Compared with the traditional solution of adding heat conduction elements, the solution has lower cost, and is suitable for large-scale production. In addition, the solution in real time monitors the temperature value, and when the temperature is less than or equal to the temperature range, restores the current of the wearable electronic device, which enables to quickly charge the apparatus and shortens the charging duration. Compared with the conventional cooling solution of temporarily stopping the charging, the solution prolongs the battery life, thereby improving the user experience, and meanwhile realizing quick charging at near room temperature.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical concept of this Application is: regarding the problems of the prior art, the embodiments of this Application propose a solution of preventing too high temperature when charging and meanwhile ensuring quick charging. The method in real time monitors the temperature when the wearable electronic device is being charged (mainly to reach the preset constant-current charging current value), obtains the temperature value, and employs current controlling measures, so that the temperature value is maintained within the temperature range, wherein when the temperature value is higher than the temperature range, the embodiment reduces the value of the charging current of the wearable electronic device, and when the temperature value is below the temperature range, the embodiment increases the value of the charging current. Such a manner does not need to extra add heat conduction elements or heat dissipation elements, which saves the cost. What is more important is that, the technical solutions of the embodiments of this Application do not generate too high temperature when charging, which does not affect the wearing comfort ability and the skin health of the user, do not need to stop the charging, and avoid the problem of overall too long charging duration that is caused by pausing charging to reduce the temperature in traditional solutions.

Figure 1:
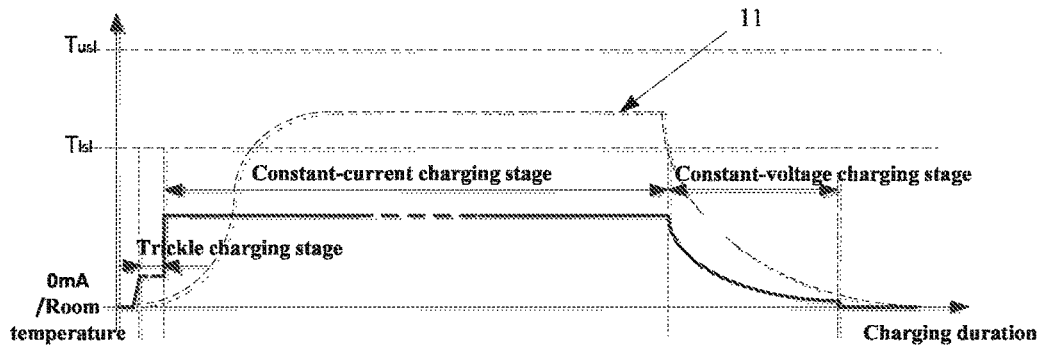
FIG. 1 is the schematic diagram of the charging curve of a lithium battery at room temperature.
Figure 2:
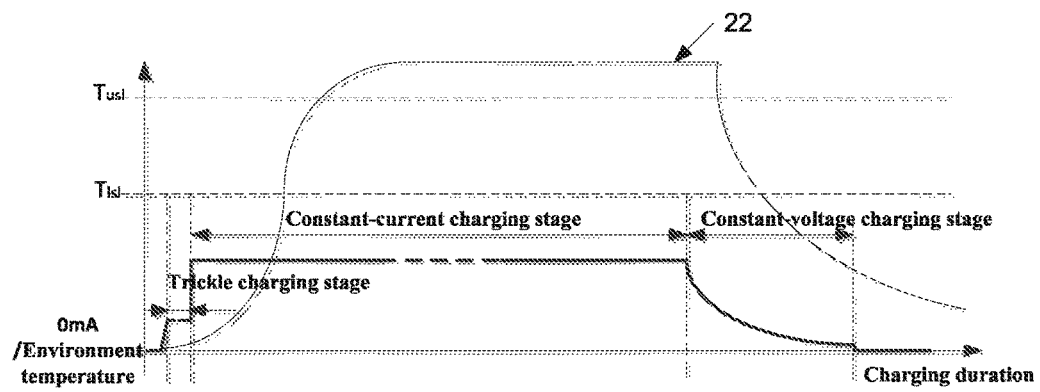
FIG. 2 is the schematic diagram of the charging curve of a lithium battery at relatively high environment temperature or in an environment of poor heat dissipation.

FIG. 1 is the schematic diagram of the charging curve of a lithium battery at room temperature. FIG. 2 is the schematic diagram of the charging curve of a lithium battery at relatively high environment temperature or in an environment of poor heat dissipation. Referring to FIG. 1 and FIG. 2, the vertical coordinate represents temperature, and the horizontal ordinate represents charging duration. In FIG. 1, the vertical coordinate Tusl is the upper limit value of the temperature that is tolerable by human body, and the vertical coordinate Tlsl is the temperature lower limit value that can ensure quick charging efficiency, and the temperature upper limit value and the temperature lower limit value define the temperature range. The charging process of the lithium battery of the wearable electronic device may be divided into generally four stages: trickle charging (low voltage precharging), constant-current charging (CC), constant-voltage charging (CV) and charging terminating. The constant-current charging (CC) is the high current stage of the four charging stages, in which the battery temperature rises very quickly. The typical charging duration-temperature curve at room temperature is as shown in FIG. 1, and the temperature in charging is within a reasonable range. The curve 11 in FIG. 1 is the illustrative temperature curve when a lithium battery is being charged. The safety precautions for common charging processes are not perfect, and when the temperature is too high, as shown in FIG. 2, as the prolong of the charging duration, the highest point of the temperature curve 22 has already exceeded the temperature upper limit value Tusl that is tolerable by human body. At this time, if the high current charging is continuously maintained, it is possible to scald the user, and even cause dangers such as battery burning and explosion. In addition, the high temperature charging condition for a long term will shorten the battery life, and affect the endurance power of the battery of wearable electronic devices.

The First Embodiment

Figure 3:
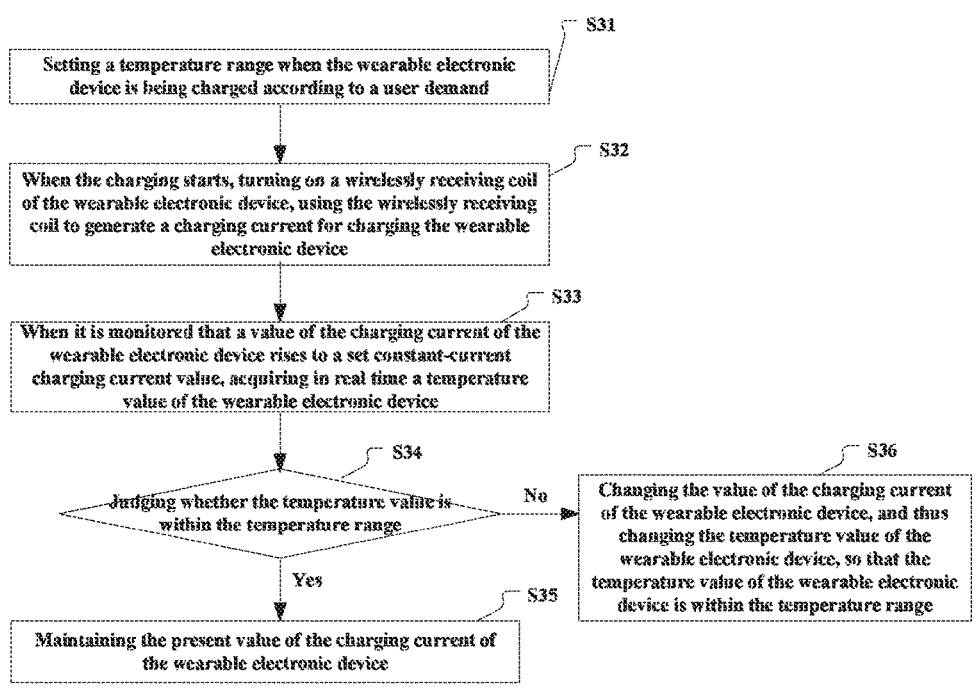
FIG. 3 is the flow chart of a charging control method for a wearable electronic device of an embodiment of this Application.

In order to solve the problem that appears in FIG. 2, the embodiments of this Application provide a charging control method for a wearable electronic device. FIG. 3 is the flow chart of a charging control method for a wearable electronic device of an embodiment of this Application. Referring to FIG. 3, the charging control method for a wearable electronic device comprises the following steps:

Step S31, setting a temperature range when the wearable electronic device is being charged according to a user demand;

Step S32, when the charging starts, turning on a wirelessly receiving coil of the wearable electronic device, and using the wirelessly receiving coil to generate a charging current for charging the wearable electronic device;

Step S33, when it is monitored that a value of the charging current of the wearable electronic device rises to a preset constant-current charging current value, acquiring in real time a temperature value of the wearable electronic device; and Step S34, judging whether the temperature value is within the temperature range; and if yes, executing Step S35, and maintaining the present value of the charging current of the wearable electronic device; and if not, executing Step S36, changing the value of the charging current of the wearable electronic device, and thus changing the temperature value of the wearable electronic device, so that the temperature value of the wearable electronic device is within the temperature range.

It can be known from the method shown in FIG. 3 that, the technical solutions of the present embodiment, in the process of the wireless charging of the wearable electronic device, when it is monitored that a value of the charging current of the wearable electronic device rises to a preset constant-current charging current value, acquire in real time a temperature value of the wearable electronic device, employ different controlling means according to the difference of the temperature value, so that when the wearable electronic device is being charged, the temperature is always within the preset temperature range, which accordingly avoids the problems of battery damage and affecting the wearing comfortability of the user that are caused by too high temperature, and avoids the problem of overall too long charging duration that is caused by the cooling technique of pausing charging, thereby increases the user usage experience and the competitive power of the products.

Specifically, by presetting the temperature range according to the usage demands of the user, it means that according to the different requirements of the users on the efficiency of quick charging of wearable electronic devices and the difference in the genders of the users (for example, the user is a male/female), different temperature ranges are set, to satisfy the personalization demands of the users. For example, according to the temperatures that are tolerable by human body, the temperature upper limit value takes a value within the range of 40-60° C., and the temperature lower limit value takes a value within the range of 35-45° C. For example, the temperature range is 37° C.-52° C.

The implementation process of the charging control method for a wearable electronic device of the present embodiment will be specifically described by taking the example that the wearable electronic devices is a smart watch. It can be understood that, the application range of the technical solutions of the embodiments of this Application is not limited to smart watch, and may also be a smart wristband or other wearable electronic devices. This type of electronic devices generally possesses the following characteristics: small power, wearability, and contacting with human skin when charging.

Figure 4:
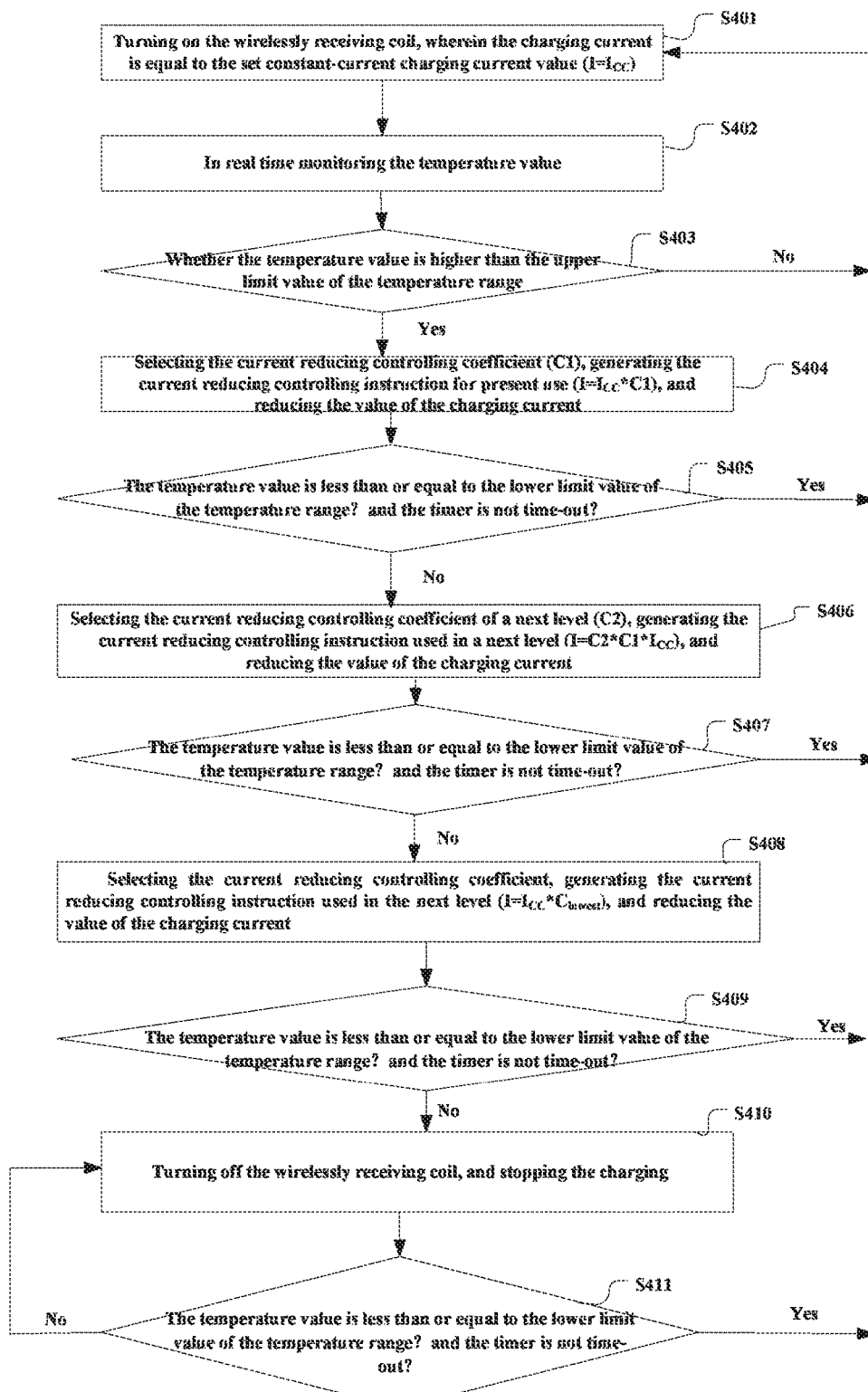
FIG. 4 is the schematic flow chart of the charging control method for a wearable electronic device provided by another embodiment of this Application.

FIG. 4 is the schematic flow chart of the charging control method for a wearable electronic device provided by another embodiment of this Application. As shown in FIG. 4, the flow starts, and executes the following Step S401 to Step S411.

Step S401, turning on the wirelessly receiving coil, the value of the charging current rising, and reaching the preset constant-current charging current value (I=ICC), and entering Step S402.

When the smart watch needs wireless charging, the wirelessly receiving coil built-in in the smart watch is turned on, and use the wirelessly receiving coil to generate a charging current for charging the smart watch. The initial charging stage of the smart watch is the trickle charging stage, which is the low voltage precharging, wherein the current is relatively small, and the temperature at the time is not too high, so measures for reducing the temperature are not required. When the value of the charging current of the battery of the smart watch rises to the constant-current charging current value that is preset by the constant-current charging stage (that is, I=ICC), start executing the corresponding operation of controlling to reduce the charging current according to the change of the temperature value.

Step S402, acquiring the real time temperature value of the battery of the smart watch, and after acquiring the real time temperature value, entering Step S403.

Specifically, by collecting in real time the voltage value of a thermistor that is electrically connected to the battery of the smart watch, calculating out a present resistance value of the thermistor according to the voltage value of the thermistor, and according to a correspondence relation between the resistance value and the temperature, the temperature value of the battery of the smart watch is obtained.

Step S403, judging whether the acquired present temperature value is higher than the upper limit value Tusl of the preset temperature range.

If not, it returns to Step S401, maintains the present value of the charging current, and continues to perform charging according to the preset constant-current charging current value. If yes, it changes the value of the charging current of the wearable electronic device; that is, when the present temperature value of the wearable electronic device is higher than the upper limit value of the temperature range, controls to reduce all at once or reduce progressively for multiple times the value of the charging current of the wearable electronic device. In the present embodiment, if the temperature value is higher than the upper limit value of the preset temperature range, execute Step S404.

Step S404, selecting the current reducing controlling coefficient (C1), generating the current reducing controlling instruction (I=ICC*C1) for present use, and reducing the value of the charging current; and after the value of the charging current is reduced, entering Step S405.

In the present embodiment, the current reducing controlling instruction is sent to a processing chip that controls the wirelessly receiving coil, to cause the processing chip to reduce a voltage numerical value of a current and power pin, thereby reducing the value of the charging current of the smart watch. In other embodiments of this Application, the current reducing controlling instruction can also be sent to the power supply side, and the electromagnetic wave signal of the wirelessly emitting coil is controlled by the power supply side, thereby reducing the value of the charging current of the smart watch, which is not limited.

The conventional wireless charging technology is realized mainly by using the electromagnetic induction principle; that is, using the energy coupling, between the wirelessly emitting coil (which can generate a magnetic field) in the electricity charger and the wirelessly receiving coil that is correspondingly provided in the smart watch, to realize the transfer of energy. On the basis of that, in the present embodiment, the current reducing controlling of the smart watch may specifically be implemented by a processing chip in the smart watch for controlling the wirelessly receiving coil, and may also be implemented by controlling the power supply side of the wirelessly emitting coil.

Step S405, judging whether the temperature value is less than or equal to the lower limit value of the temperature range and whether the timer is time-out; and if yes, returning to Step S401, controlling to increase the value of the charging current of the smart watch to the preset constant-current charging current ICC; and if not, executing Step S406, selecting current reducing controlling coefficients (C1 and C2) for the next level, generating the current reducing controlling instruction that is used in a next level (I=C2*C1*ICC), and further reducing the value of the charging current.

It should be noted that, in the embodiments of this Application the lower limit value of the temperature range is set to serve as a suspending point for a reducing operation in the operation of reducing the value of the charging current in multiple-level current reducing controlling. That is, when it is monitored that the real time temperature value is less than or equal to the temperature lower limit value of the set temperature range, the operation of reducing the value of the charging current is stopped, so as to restore to an appropriate current value, and complete the charging as soon as possible.

It should be noted that, the relation between the temperature condition and the time condition in Step S405 is logical sum. That is, when the time condition is satisfied (the duration reaches the preset present duration threshold), further judge whether the temperature condition is satisfied, and if the temperature condition is also satisfied (that is, the temperature value is less than or equal to the lower limit value of the temperature range), control to increase the value of the charging current, so as to increase the temperature value. Here, the controlling to increase the value of the charging current may be increasing the present value of the charging current to the preset constant-current charging current value, which can ensure the charging efficiency of quick charging. If the temperature condition is not satisfied, that is, the temperature value is higher than the lower limit value of the temperature range, control to continue to reduce the present value of the charging current, that is, execute Step S406.

Step S406, selecting current reducing controlling coefficients (C1 and C2) of a next level, generating the current reducing controlling instruction that is used in a next level (I=C2*C1*ICC), and reducing the value of the charging current; and after the value of the charging current is reduced, entering Step S407.

Step S407, judging whether the present temperature value is less than or equal to the lower limit value of the temperature range and whether the timer is not time-out; and if yes, returning to Step S401, and controlling to increase the present value of the charging current of the smart watch to the preset constant-current charging current value ICC; and if not, entering Step S408.

In Step S407, the result of the comparison, between the temperature value of the lithium battery acquired in real time after the current reduction of Step S406 and the temperature lower limit value, is judged, and if the temperature value is less than or equal to the lower limit value TIsl of the preset temperature range and the timer is not time-out, control to increase the value of the charging current of the lithium battery to the preset constant-current charging current value, that is, making I=ICC. If the temperature value is higher than the lower limit value TIsl of the preset temperature range and the timer is already time-out, execute Step S408.

Step S408, selecting the current reducing controlling coefficient, generating the current reducing controlling instruction that is used in the next level (I=ICC*Clowest), and reducing the value of the charging current, and after the value of the charging current is reduced, entering Step S409.

In Step S408, generate the current reducing controlling instruction that is used in the next level, and execute this current reducing controlling instruction, to further reduce the value of the charging current of the smart watch. Specifically, in the present step, the content of the current reducing controlling instruction is to set the value of the charging current to be equal to the product value of the constant-current charging current value ICC and the preset minimum value of the current reducing controlling coefficient Clowest.

Step S409, judging whether the temperature value is less than or equal to the lower limit value of the temperature range and whether the timer is not time-out; and if not, entering Step S410.

In Step S409, the result of the comparison, between the temperature value of the lithium battery acquired in real time after the current reduction of Step S408 and the temperature lower limit value, is judged, and if the temperature value is less than or equal to the lower limit value TIsl of the preset temperature range and the timer is not time-out, return to Step S401, control to increase the charging current of the smart watch to the preset constant-current charging current value I=ICC, and continue the charging. If the temperature value is higher than the lower limit value TIsl of the preset temperature range and the timer is already time-out, execute Step S410, control to turn off the wirelessly receiving coil, and stop the charging.

It should be noted that, in the present embodiment, only the means for controlling the current reducing by using the minimum value of the current reducing controlling coefficient is illustrated. In other embodiments, whether to turn off the wirelessly receiving coil may also be determined by counting the time number of current reducing, and by using the result of the comparison between the current reducing time number and a preset current reducing time number threshold. Continuously taking the content of FIG. 4 as an example, the present embodiment performs three times of current reducing, which are in Steps S404, S406 and S408. After the current reducing of Step S408 is executed, it may be judged in Step S409 whether the accumulated current reducing time number is equal to the preset current reducing time number threshold; and if yes, execute Step S410.

Step S410, turning off the wirelessly receiving coil, and stopping the charging; and entering Step S411.

Step S411, judging whether the temperature value is less than or equal to the lower limit value of the temperature range and whether the timer is not time-out; and if yes, executing Step S401; and if not, executing Step S410.

In Step S411, it judges whether the present temperature value of the lithium battery of the smart watch after the charging is stopped is less than or equal to the lower limit value of the temperature range, and if the temperature value is already less than or equal to the lower limit value of the temperature range, control to turn on the wirelessly receiving coil again, increase the value of the charging current of the smart watch to the preset constant-current charging current value I=ICC, and continue the charging, to complete the charging process as soon as possible. If the temperature value is already higher than the lower limit value of the temperature range, continue to turn off the wirelessly receiving coil, and maintain the charging stopping state, and the result of the comparison between the temperature value and the lower limit value of the temperature range is judged in real time, and when the temperature value falls back to the lower limit value of the temperature range, turn on the wirelessly receiving coil, and continues the charging.

It should be noted that, Step S401 comprises the two substeps of turning on the wirelessly receiving coil and setting the value of the charging current to be equal to the preset constant-current charging current value. In practical applications it is required to judge whether the wirelessly receiving coil is to be turned on according to the circumstance. For example, in Step S405, if it is determined that the temperature value is less than or equal to the lower limit value of the preset temperature range and the timer is not time-out, it only needs to control to increase the value of the charging current, and set the present value of the charging current to be the constant-current charging current value, and does not need to turn on the wirelessly receiving coil again. However, in Step S411, because Step S410 was executed previously and the wirelessly receiving coil was turned off, if in Step S411 it is determined that the temperature value is less than or equal to the lower limit value of the temperature range and the timer is not time-out, it needs to turn on the wirelessly receiving coil again, receives the charging current again, and increases the value of the charging current to the preset constant-current charging current value.

The Second Embodiment

Figure 5:
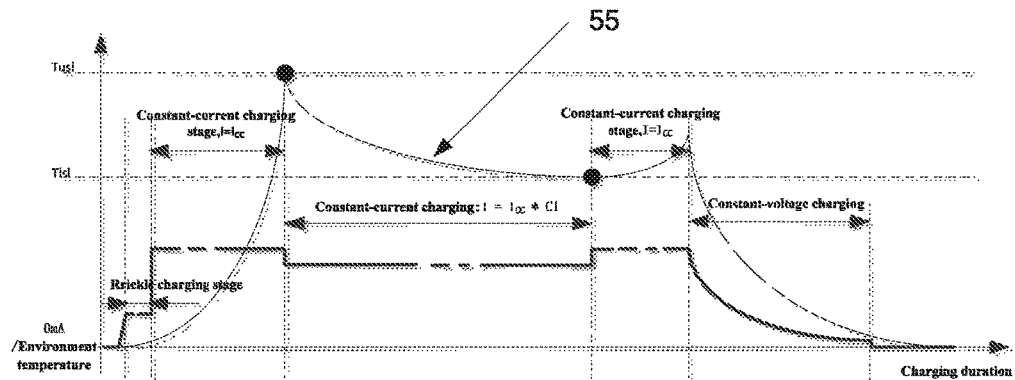
FIG. 5 is the schematic diagram of the charging curve of a lithium battery at relatively high environment temperature or in an environment of poor heat dissipation provided by another embodiment of this Application.

FIG. 5 is the schematic diagram of the charging curve of a lithium battery at relatively high environment temperature or in an environment of poor heat dissipation provided by another embodiment of this Application. Referring to FIG. 5, in the present embodiment, the case wherein the value of the charging current of the wearable electronic device is controlled to be reduced all at once is illustrated. Specifically, the level current reducing controlling coefficient for present use is a current reducing controlling coefficient C1 of a first level (C1 is a numerical value that is less than 1), and a current reducing controlling instruction for present use is generated according to the current reducing controlling coefficient C1 of the first level (setting a product value of the current reducing controlling coefficient of the first level and the preset constant-current charging current value in the current reducing controlling instruction for the present use, to indicate that the value of the charging current after current reduction of the present level is this product value); and send this current reducing controlling instruction to a processing chip that controls the wirelessly receiving coil, to cause the processing chip to reduce a voltage numerical value of a current and power pin, thereby reducing the value of the charging current of the wearable electronic device.

Referring to the curve 55 of the battery temperature varying with time in FIG. 5, after one time of current reducing is employed, the temperature of the battery of the smart watch falls back to around the lower limit value of the temperature range, and under the effect of the current reducing measures, the temperature of the battery of the smart watch increases accidently. However, it is not required to employ the measures for reducing the charging current and reduce the temperature so long as the upper limit value of the preset temperature range is not exceeded, which can ensure the quick charging and save the charging time.

In the present embodiment, the method further comprises setting a duration threshold, timing from the time point when the value of the charging current of the wearable electronic device is reduced, to obtain a present current reducing duration; and if when the present current reducing duration is equal to the preset present duration threshold, the temperature value that is in real time monitored is still within the temperature range, according to a current reducing controlling coefficient of a next level that is used in a next level, generating a current reducing controlling instruction of a next level, and controlling to continue to reduce the value of the charging current of the wearable electronic device.

The effect of setting the duration threshold is to reduce the temperature within a set duration window, and the duration threshold can be set according to the demands of practical applications. For example, in environments that are relatively sensitive to temperature, the duration may be set to be relatively short, and accordingly if the temperature does not fall to the preset condition within a short duration, further cooling measures may be employed (that is, selecting a current reducing controlling parameter of a next level, and generating a current reducing controlling instruction of a next level). When the operations are in environments that are not sensitive to temperature, the duration threshold may be set to be relatively long, which can shorten the charging duration.

The Third Embodiment

Figure 6:
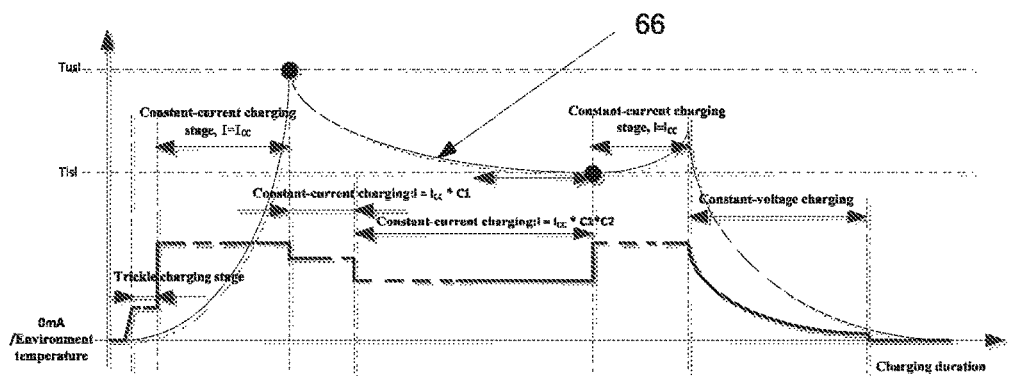
FIG. 6 is the schematic diagram of the charging curve of a lithium battery at relatively high environment temperature or in an environment of poor heat dissipation provided by another embodiment of this Application.

FIG. 6 is the schematic diagram of the charging curve of a lithium battery at relatively high environment temperature or in an environment of poor heat dissipation provided by another embodiment of this Application. If, after the current reducing controlling measure of a first level is employed, the temperature of the smart watch is still not less than or equal to the lower limit value of the temperature range, and the preset timer time is already time-out, further current reducing controlling measures are employed, to further reduce the value of the charging current of the smart watch, and thus reduce the temperature value. In the present embodiment, the case wherein when current reducing controlling means of two levels are employed to cool, the current reducing controlling means of two levels have a progressive relation, is illustrated. It can be understood that, if, after the current reducing controlling measure of a first level is employed, the temperature value of the lithium battery of the smart watch has already fallen to be less than or equal to the lower limit value of the temperature range when the duration reaches the present set duration threshold, the current reducing controlling measure of a second level may be omitted.

Specifically, referring to the curve 66 of the battery temperature varying with time in FIG. 6, when the value of the charging current of the smart watch reaches the set constant-current charging current value, that is, I=ICC, according to the current reducing controlling coefficient of a first level, control to generate the current reducing controlling instruction of a first level (that is, set the charging current to be I=ICC*C1), and, according to the result of the monitoring of the present temperature, if the present temperature value is still relatively high (for example, not less than or equal to the lower limit value of the temperature range), select the current reducing controlling coefficient of a next level (C2, C2 is less than 1), control to generate the current reducing controlling instruction of a next level (that is, set the charging current I=ICC*C1*C2), and send the current reducing controlling instruction to a processing chip that controls the wirelessly receiving coil, to cause the processing chip to reduce a voltage numerical value of a current and power pin, thereby reducing the value of the charging current of the wearable electronic device, and thus reducing the temperature of the smart watch, to prevent the adverse outcomes caused by too high temperature.

As shown in FIG. 6, after two levels of processively descending current reducing, the temperature curve of the smart watch has already presented an overall downward trend, and no longer approaches the upper limit value Tusl of the temperature range. Accordingly, current reducing controlling measures may be not taken further, to ensure the charging efficiency and save the charging time.

The Fourth Embodiment

Figure 7:
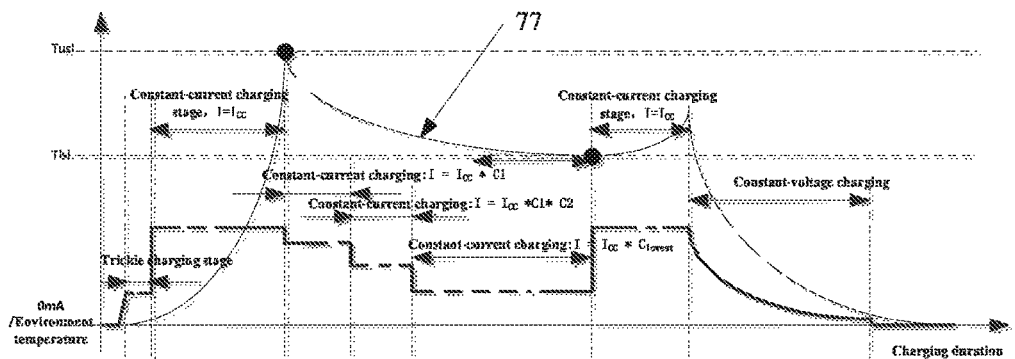
FIG. 7 is the schematic diagram of the charging curve of a lithium battery at relatively high environment temperature or in an environment of poor heat dissipation provided by another embodiment of this Application.

FIG. 7 is the schematic diagram of the charging curve of a lithium battery at relatively high environment temperature or in an environment of poor heat dissipation provided by another embodiment of this Application. In the present embodiment, the case wherein when three levels of current reducing controlling means are employed to cool, the three levels of current reducing controlling means have a progressive relation, is illustrated. It can be understood that, if, after one level or two levels of current reducing controlling are employed, the temperature value of the lithium battery of the smart watch has already fallen to be less than or equal to the lower limit value of the temperature range when the duration reaches the present set duration threshold, the second or third level of current reducing controlling measure may be omitted.

Referring to the curve 77 of the battery temperature varying with time in FIG. 7, when the lithium battery of the smart watch is in the trickle charging stage, the temperature is relatively low, and when the value of the charging current of the lithium battery of the smart watch rises to the set constant-current charging current value, that is, I=ICC, the temperature rises very quickly. Here, according to the temperature value that is in real time monitored, a current reducing controlling coefficient of a first level (that is, C1) is selected, the current reducing controlling instruction of a first level (that is, make I=ICC*C1) is generated according to the current reducing controlling coefficient of a first level, and the current reducing controlling instruction is sent to a processing chip that controls the wirelessly receiving coil, to cause the processing chip to reduce a voltage numerical value of a current and power pin, thereby reducing the value of the charging current of the smart watch.

As shown by the curve 77 in FIG. 7, if, after the first level of current reducing within the duration that is set by the first timer, the temperature value of the lithium battery that is in real time collected is still relatively high (for example, higher than the lower limit value of the temperature range), a current reducing controlling coefficient of a next level (C2, C2 is less than 1) is selected, control to generate the current reducing controlling instruction of a next level (that is, set the charging current I=ICC*C1*C2) according to the current reducing controlling coefficients of a next level C1 and C2, and the current reducing controlling instruction is sent to a processing chip that controls the wirelessly receiving coil, to cause the processing chip to reduce a voltage numerical value of a current and power pin, thereby reducing the value of the charging current of the wearable electronic device, and thus reducing the temperature of the smart watch.

If, after the two levels of current reducing within the duration that is set by the second timer, the temperature value that is in real time collected is still relatively high (for example higher than the lower limit value of the temperature range), the current reducing controlling coefficient of a next level (Clowest) is selected, and control to generate the current reducing controlling instruction of a next level (that is, set the charging current I=ICC*Clowest) according to the current reducing controlling coefficient of a next level Clow-est, and the current reducing controlling instruction is sent to a processing chip that controls the wirelessly receiving coil, to cause the processing chip to reduce a voltage numerical value of a current and power pin, thereby reducing the value of the charging current of the smart watch to the predetermined minimum value.

Here, it should be noted that, after the current reducing wherein the current reducing controlling instructions are individually generated according to the current reducing controlling coefficient of a first level and the current reducing controlling coefficient of a second level, if the temperature value is still higher than the lower limit value Tlsl of the temperature range, that indicates that the effect caused by the means of reducing the temperature is not obvious, and it may be considered to set the value of the charging current of the lithium battery of the smart watch to be the preset minimum value of current, wherein the preset minimum value of current is preferably the value of the charging current of the trickle charging stage. Accordingly, the temperature value can be reduced as quick as possible.

After controlling to generate the current reducing controlling instruction (that is, setting the charging current I=ICC*Clowest) of a next level, and performing current reducing according to the current reducing controlling coefficient Clowest of a next level, within the duration that is preset by the third timer, judge whether the temperature value monitored in real time is less than or equal to the lower limit value of the temperature range, and if, within the duration that is preset by the third timer, the temperature value is less than or equal to the lower limit value of the temperature range, control to increase the value of the charging current of the lithium battery of the smart watch, and continues the charging.

It should be noted that, in the present embodiment, the value ranges of the current reducing controlling coefficient C1 and the current reducing controlling coefficient C2 are preferably 0.1-0.5. The duration that is set by the first timer, the duration that is set by the second timer and the duration that is set by the third timer individually correspond to the electricity current reducing controlling instruction of each level, and the durations that are set by the three timers may be the same or different.

The Fifth Embodiment

Figure 8:
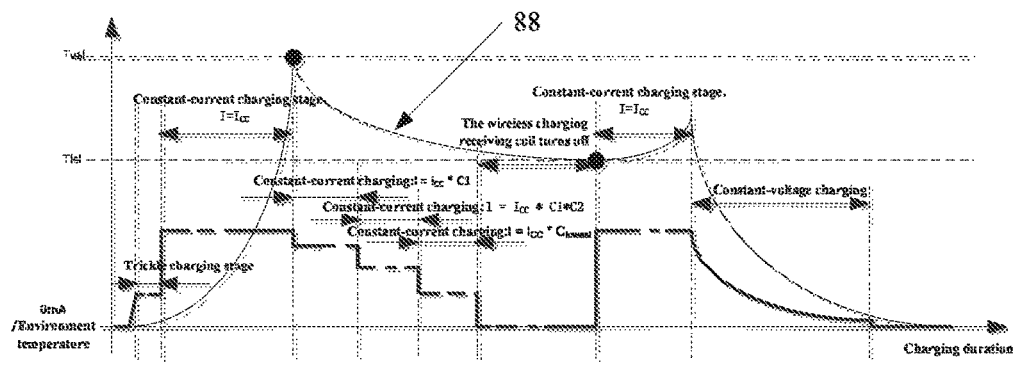
FIG. 8 is the schematic diagram of the charging curve of a lithium battery at relatively high environment temperature or in an environment of poor heat dissipation provided by another embodiment of this Application.

FIG. 8 is the schematic diagram of the charging curve of a lithium battery at relatively high environment temperature or in an environment of poor heat dissipation provided by another embodiment of this Application. In the present embodiment, the case wherein when four levels of current reducing controlling means are employed to cool, the four levels of current reducing controlling means have a progressive relation, is illustrated. It can be understood that, if, after one level, two levels or three levels of current reducing controlling are employed, the temperature value of the lithium battery of the smart watch has already fallen to be less than or equal to the lower limit value of the temperature range when the duration reaches the present set duration threshold, the second, the third or the forth level of current reducing controlling measure may be omitted.

Referring to the curve 88 of the battery temperature varying with time in FIG. 8, it should be noted that, the first three levels of current reducing controlling measures of the present embodiment are the same as the three levels of current reducing controlling instruction of the third embodiment, which can be seen in the description on the above third embodiment, and will not be in detail described here.

The present embodiment emphatically describes the controlling means for the case wherein after the three levels of current reducing controlling means are employed, within the duration that is set by the third timer, the temperature value is still higher than the lower limit value of the temperature range.

Specially, referring to FIG. 8, the duration of the current reducing is counted from the time point when the third level of current reducing measure starts to be executed, and if when the present current reducing duration is equal to the preset present duration threshold (that is, the duration that is set by the fourth timer), the temperature value that is in real time monitored is still within the temperature range, the wirelessly receiving coil of the smart watch is controlled to be turned off, and stop the charging, to wait for the temperature to fall back. The temperature value is monitored in real time, and judge whether the temperature value that is monitored is less than or equal to the lower limit value of the temperature range within the duration that is set by the fourth timer; and if yes, turn on the wirelessly receiving coil again; and if not, continue to turn off the wirelessly receiving coil, and stop the charging, and continues to judge the result of the comparison between the temperature that is monitored and the lower limit value of the temperature range.

In the present embodiment, the method further comprises: setting a current reducing time number threshold or setting a lowest value of the charging current, and when reducing the value of the charging current of the smart watch by using multiple-level progression, accumulating the current reducing time number, and when the accumulated time number reaches the set current reducing time number threshold, controlling to turn off the wirelessly receiving coil of the wearable electronic device, and stopping the charging, to wait for the temperature to fall back. For example, the current reducing time number threshold is set to be three. In the present embodiment, each time the current reducing is performed once, the counted time number is added by 1 to accumulate. It can be seen that, in the present embodiment, the set current reducing time number threshold is reached only after accumulatively three times of current reducing, so it may take no account of the preset duration and judge only according to the single condition whether the temperature value is less than or equal to the temperature lower limit value, and if the temperature value that is monitored is still higher than the lower limit value, the wirelessly receiving coil is turned off directly, and stop the charging. Alternatively, if controlling to reduce progressively for multiple times the value of the charging current of the smart watch, if the present value of the charging current is not greater than the lowest value of the charging current, and the temperature value that is in real time monitored is still within the temperature range, control to turn off the wirelessly receiving coil of the smart watch.

The Sixth Embodiment

Figure 9:
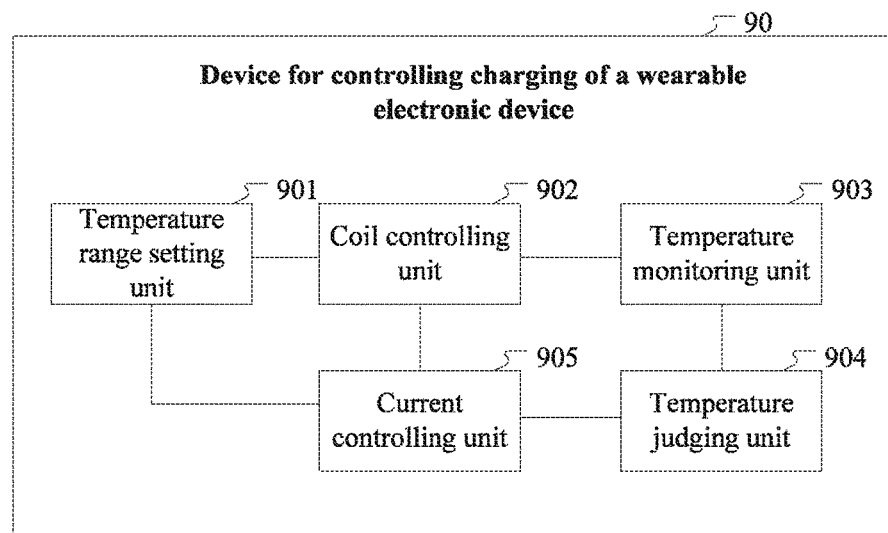
FIG. 9 is the structural block diagram of a charging control apparatus for a wearable electronic device of an embodiment of this Application.

FIG. 9 is the structural block diagram of a charging control apparatus for a wearable electronic device of an embodiment of this Application. Referring to FIG. 9, the apparatus 90 for controlling charging of a wearable electronic device of the present embodiment comprises:

a temperature range setting unit 901, for setting a temperature range when the wearable electronic device is being charged according to a user demand;

a coil controlling unit 902, for when the charging starts, turning on a wirelessly receiving coil of the wearable electronic device, and using the wirelessly receiving coil to generate a charging current for charging the wearable electronic device;

a temperature monitoring unit 903, for when it is monitored that a value of the charging current of the wearable electronic device rises to a preset constant-current charging current value, acquiring in real time a temperature value of the wearable electronic device;

a temperature judging unit 904, for judging whether the temperature value is within the temperature range; and a current controlling unit 905, for according to a judgment result of the temperature judging unit, maintaining the present value of the charging current of the wearable electronic device; or, changing the value of the charging current of the wearable electronic device, and thus changing the temperature value of the wearable electronic device, so that the temperature value of the wearable electronic device is within the temperature range.

In an embodiment of this Application, the temperature monitoring unit 903 is specifically for collecting in real time a voltage value of a thermistor that is electrically connected to a battery of the wearable electronic device; and calculating out a present resistance value of the thermistor according to the voltage value of the thermistor, and according to a correspondence relation between the resistance value and the temperature, obtaining the temperature value of the battery of the wearable electronic device.

In an embodiment of this Application, the temperature range setting unit 901 is for setting the temperature range to be the range between a set temperature upper limit value and a set temperature lower limit value;

the current controlling unit 905 is specifically for when the temperature value of the wearable electronic device is higher than the upper limit value of the temperature range, controlling to reduce all at once or reduce progressively for multiple times the value of the charging current of the wearable electronic device, so that the temperature value monitored in real time is less than or equal to the temperature lower limit value; and, when the temperature value of the wearable electronic device is less than or equal to the lower limit value of the temperature range, controlling to increase the value of the charging current of the wearable electronic device.

In an embodiment of this Application, the current controlling unit 905 is specifically for setting one or more level current reducing controlling coefficients, and generating a current reducing controlling instruction for present use according to a corresponding level current reducing controlling coefficient; and sending the current reducing controlling instruction to a processing chip that controls the wirelessly receiving coil, to cause the processing chip to reduce a voltage numerical value of a current and power pin, thereby reducing the value of the charging current of the wearable electronic device.

In an embodiment of this Application, the current controlling unit 905 is specifically for according to a level current reducing controlling coefficient for present use, generating the present current reducing controlling instruction;

In an embodiment of this Application, the apparatus 90 for controlling charging of a wearable electronic device further comprises: a duration threshold setting unit, for setting a duration threshold; and the current controlling unit 905 is for controlling to reduce the value of the charging current of the wearable electronic device according to the present current reducing controlling instruction, so that the wearable electronic device is charged according to the current value that has been reduced; timing from the time point when the value of the charging current of the wearable electronic device is reduced, to obtain a present current reducing duration; and if when the present current reducing duration is equal to the preset present duration threshold, the temperature value that is in real time monitored by the temperature monitoring unit 903 is still within the temperature range, the current controlling unit 905, according to a current reducing controlling coefficient of a next level that is used in a next level, generates a current reducing controlling instruction of a next level, and controls to continue to reduce the value of the charging current of the wearable electronic device.

In an embodiment of this Application, the current controlling unit 905 is further for if when the present current reducing duration is equal to the preset present duration threshold, the temperature value that is in real time monitored by the temperature monitoring unit 903 is still within the temperature range, the current controlling unit 905, controlling to turn off the wirelessly receiving coil of the wearable electronic device; in an embodiment of this Application, the apparatus 90 for controlling charging of a wearable electronic device further comprises: a current reducing time number threshold setting unit for setting a current reducing time number threshold or a lowest value of the charging current setting unit for setting a lowest value of the charging current, the current controlling unit 905 is for, if controlling to reduce progressively for multiple times the value of the charging current of the wearable electronic device, accumulating the current reducing time number, and if the accumulated current reducing time number reaches the current reducing time number threshold that is set by the current reducing time number threshold setting unit, and the temperature value that is in real time monitored by the temperature monitoring unit 903 is still within the temperature range, controlling to turn off the wirelessly receiving coil of the wearable electronic device; or the current controlling unit 905 is for, if controlling to reduce progressively for multiple times the value of the charging current of the wearable electronic device, if the present value of the charging current is not greater than the lowest value of the charging current, and the temperature value that is in real time monitored by the temperature monitoring unit 903 is still within the temperature range, controlling to turn off the wirelessly receiving coil of the wearable electronic device.

In an embodiment of this Application, the current controlling unit 905 is specifically for setting a current reducing controlling coefficient of a first level, wherein the current reducing controlling coefficient of a first level is a numerical value that is less than 1; and the generating a current reducing controlling instruction for present use according to a corresponding level current reducing controlling coefficient comprises: when the level current reducing controlling coefficient for present use is the current reducing controlling coefficient of the first level, setting a product value of the current reducing controlling coefficient of the first level and the set constant-current charging current value, in the current reducing controlling instruction for present use, to indicate that the value of the charging current after current reduction of the present level is the product value; or, the current controlling unit 905 is specifically for setting a current reducing controlling coefficient of a first level and a current reducing controlling coefficient of a second level, wherein the current reducing controlling coefficient of the first level and the current reducing controlling coefficient of the second level are both numerical values that are less than 1; and the according to a current reducing controlling coefficient of a next level that is used in a next level, generating a current reducing controlling instruction of a next level comprises: when the current reducing controlling coefficient of the next level that is used in the next level comprises the current reducing controlling coefficient of the first level and the current reducing controlling coefficient of the second level, setting a product value of the current reducing controlling coefficient of the second level and the current reducing controlling coefficient of the first level and the set constant-current charging current value, in the current reducing controlling instruction of the next level, to indicate that the value of the charging current after current reduction of the next level is the product value.

It should be noted that, the apparatus for controlling charging of a wearable electronic device of the present embodiment is corresponding to the charging control method for a wearable electronic device of the above embodiments, and the implementation steps of the apparatus charging control apparatus for a wearable electronic device of the present embodiment may be specifically seen in the description on the portion of the above charging control method for a wearable electronic device, and will not be in detail described here.

Furthermore, still another embodiment of this Application further provides a smart watch, wherein the smart watch is provided with the apparatus charging control apparatus for a wearable electronic device of the above embodiment of this Application, and the apparatus for controlling charging causes a temperature value of the smart watch when being charged in a wireless mode to be within a set temperature range. Because the temperature of the smart watch in wireless charging is controlled within the set temperature range, thereby the user usage experience is enhanced and the competitive power of the smart watch is greatly increased.

In conclusion, it can be known that, the technical solutions of the embodiments of this Application set the temperature range, and when the value of the charging current of the wearable electronic device rises to the set constant-current charging current value, according to the temperature value of the wearable electronic device that is in real time monitored and the result of the comparison between the temperature value and the temperature range, employ corresponding current controlling measures. In especial when the temperature value exceeds the temperature range, the technical solutions reduce the temperature by reducing the charging current. Compared with the traditional solution of adding heat conduction elements, the solution has lower cost, and is suitable for large-scale applications.

In addition, the solution in real time monitors the temperature value, and when the temperature is less than or equal to the temperature range, restores the current of the wearable electronic device, which enables the apparatus to quickly charge and shortens the charging duration. Compared with the conventional cooling solution of temporarily stopping the charging, the solution prolongs the battery life, and meanwhile realizes quick charging at near room temperature, thereby improving the user experience.

The above descriptions are merely preferable embodiments of this Application, and are not limiting the protection scope of this Application. Any modifications, equivalent substitutions or improvements that are made within the spirit and principle of this Application are all included in the protection scope of this Application.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A charging control method for a wearable electronic device, wherein, the method comprises:
    setting a temperature range when the wearable electronic device is being charged according to a user demand;
    when the charging starts, turning on a wirelessly receiving coil of the wearable electronic device, and using the wirelessly receiving coil to generate a charging current for charging the wearable electronic device;
    when it is monitored that a value of the charging current of the wearable electronic device rises to a set constant-current charging current value, acquiring in real time a temperature value of the wearable electronic device; and
    judging whether the temperature value is within the temperature range; and if yes, maintaining the present value of the charging current of the wearable electronic device; and if not, changing the value of the charging current of the wearable electronic device, and thus changing the temperature value of the wearable electronic device, so that the temperature value of the wearable electronic device is within the temperature range;
    wherein the step of changing the value of the charging current of the wearable electronic device, and thus changing the temperature value of the wearable electronic device, so that the temperature value of the wearable electronic device is within the temperature range particularly comprises: when the temperature value is higher than the temperature range, reducing the value of the charging current of the wearable electronic device, and when the temperature value is below the temperature range, increasing the value of the charging current of the wearable electronic device.

2. The method according to claim 1, wherein, the acquiring in real time a temperature value of the wearable electronic device comprises:
    collecting in real time a voltage value of a thermistor that is electrically connected to a battery of the wearable electronic device; and
    calculating out a present resistance value of the thermistor according to the voltage value of the thermistor, and according to a correspondence relation between the resistance value and the temperature, obtaining the temperature value of the battery of the wearable electronic device.

3. The method according to claim 1, wherein, the temperature range is the range between a set temperature upper limit value and a set temperature lower limit value, and the changing the value of the charging current of the wearable electronic device comprises:
    when the temperature value of the wearable electronic device is higher than the upper limit value of the temperature range, controlling to reduce all at once or reduce progressively for multiple times the value of the charging current of the wearable electronic device, so that the temperature value monitored in real time is less than or equal to the temperature lower limit value; and
    when the temperature value of the wearable electronic device is less than or equal to the lower limit value of the temperature range, controlling to increase the value of the charging current of the wearable electronic device.

4. The method according to claim 3, wherein, the controlling to reduce all at once or reduce progressively for multiple times the value of the charging current of the wearable electronic device comprises:
    setting one or more level current reducing controlling coefficients, and generating a current reducing controlling instruction for present use according to a corresponding level current reducing controlling coefficient; and
    sending the current reducing controlling instruction to a processing chip that controls the wirelessly receiving coil, to cause the processing chip to reduce a voltage numerical value of a current and power pin, thereby reducing the value of the charging current of the wearable electronic device.

5. The method according to claim 4, wherein, the generating a current reducing controlling instruction for present use according to a corresponding level current reducing controlling coefficient comprises: according to a level current reducing controlling coefficient for present use, generating the present current reducing controlling instruction;
    the method further comprises setting a duration threshold; and
    the controlling to reduce all at once or reduce progressively for multiple times the value of the charging current of the wearable electronic device, so that the temperature value monitored in real time is less than or equal to the temperature lower limit value comprises:
    controlling to reduce the value of the charging current of the wearable electronic device according to the present current reducing controlling instruction, so that the wearable electronic device is charged according to the current value that has been reduced;
    timing from the time point when the value of the charging current of the wearable electronic device is reduced, to obtain a present current reducing duration; and
    if when the present current reducing duration is equal to the preset duration threshold, the temperature value monitored in real time is still within the temperature range, according to current reducing controlling coefficient of a next level that are used in a next level, generating a current reducing controlling instruction of a next level, and controlling to continue to reduce the value of the charging current of the wearable electronic device.

6. The method according to claim 5, wherein, the controlling to reduce all at once or reduce progressively for multiple times the value of the charging current of the wearable electronic device, so that the temperature value monitored in real time is less than or equal to the temperature lower limit value further comprises: if when the present current reducing duration is equal to the preset duration threshold, the temperature value monitored in real time is still within the temperature range, then controlling to turn off the wirelessly receiving coil of the wearable electronic device; and
    the method further comprises: setting a current reducing time number threshold or setting a lowest value of the charging current; and if controlling to reduce progressively for multiple times the value of the charging current of the wearable electronic device, accumulating the current reducing time number, and if the accumulated current reducing time number reaches the preset current reducing time number threshold, and the temperature value monitored in real time is still within the temperature range, controlling to turn off the wirelessly receiving coil of the wearable electronic device; or if controlling to reduce progressively for multiple times the value of the charging current of the wearable electronic device, if the present value of the charging current is not greater than the lowest value of the charging current, and the temperature value monitored in real time is still within the temperature range, controlling to turn off the wirelessly receiving coil of the wearable electronic device.

7. The method according to claim 6, wherein, the setting one or more level current reducing controlling coefficients comprises: setting a current reducing controlling coefficient of a first level, wherein the current reducing controlling coefficient of the first level is a numerical value that is less than 1;

the generating a current reducing controlling instruction for present use according to a corresponding level current reducing controlling coefficient comprises:

when the level current reducing controlling coefficient for present use is the current reducing controlling coefficient of the first level, setting a product value of the current reducing controlling coefficient of the first level and the set constant-current charging current value in the current reducing controlling instruction for present use, to indicate that the value of the charging current after the current reduction of the present level is the product value; or, the setting one or more level current reducing controlling coefficients comprises: setting a current reducing controlling coefficient of a first level and a current reducing controlling coefficient of a second level, wherein the current reducing controlling coefficient of the first level and the current reducing controlling coefficient of the second level are both numerical values that are less than 1; and the according to current reducing controlling coefficients of a next level that are used in a next level, generating a current reducing controlling instruction of a next level comprises:

when the current reducing controlling coefficients of a next level that are used in a next level comprises the current reducing controlling coefficient of the first level and the current reducing controlling coefficient of the second level, setting a product value of the current reducing controlling coefficient of the second level and the current reducing controlling coefficient of the first level and the set constant-current charging current value, in the current reducing controlling instruction of a next level, to indicate that the value of the charging current after the current reduction of the next level is the product value.

8. A charging control apparatus for a wearable electronic device, wherein, the apparatus comprises a processor and at least one computer-readable storage medium, the at least one computer-readable storage medium stores computer-executable instructions which, when executed by the processor, cause the processor to perform operations comprise:

setting a temperature range when the wearable electronic device is being charged according to a user demand;

when the charging starts, turning on a wirelessly receiving coil of the wearable electronic device, and using the wirelessly receiving coil to generate a charging current for charging the wearable electronic device;

when it is monitored that a value of the charging current of the wearable electronic device rises to a set constant-current charging current value, acquiring in real time a temperature value of the wearable electronic device;

judging whether the temperature value is within the temperature range; and if yes, maintaining the present value of the charging current of the wearable electronic device; and if not, changing the value of the charging current of the wearable electronic device, and thus changing the temperature value of the wearable electronic device, so that the temperature value of the wearable electronic device is within the temperature range;

wherein the step of changing the value of the charging current of the wearable electronic device, and thus changing the temperature value of the wearable electronic device, so that the temperature value of the wearable electronic device is within the temperature range particularly comprises: when the temperature value is higher than the temperature range, reducing the value of the charging current of the wearable electronic device, and when the temperature value is below the temperature range, increasing the value of the charging current of the wearable electronic device.

9. The apparatus according to claim 8, wherein, the acquiring in real time a temperature value of the wearable electronic device comprises:

collecting in real time a voltage value of a thermistor that is electrically connected to a battery of the wearable electronic device; and calculating out a present resistance value of the thermistor according to the voltage value of the thermistor, and according to a correspondence relation between the resistance value and the temperature, obtaining the temperature value of the battery of the wearable electronic device.

10. The apparatus according to claim 8, wherein, the temperature range is the range between a set temperature upper limit value and a set temperature lower limit value; and the changing the value of the charging current of the wearable electronic device comprises:

when the temperature value of the wearable electronic device is higher than the upper limit value of the temperature range, controlling to reduce all at once or reduce progressively for multiple times the value of the charging current of the wearable electronic device, so that the temperature value monitored in real time is less than or equal to the temperature lower limit value; and, when the temperature value of the wearable electronic device is less than or equal to the lower limit value of the temperature range, controlling to increase the value of the charging current of the wearable electronic device.

11. The apparatus according to claim 10, wherein, the controlling to reduce all at once or reduce progressively for multiple times the value of the charging current of the wearable electronic device comprises:

setting one or more level current reducing controlling coefficients, and generating a current reducing controlling instruction for present use according to a corresponding level current reducing controlling coefficient; and sending the current reducing controlling instruction to a processing chip that controls the wirelessly receiving coil, to cause the processing chip to reduce a voltage numerical value of a current and power pin, thereby reducing the value of the charging current of the wearable electronic device.

12. The apparatus according to claim 11, wherein, the generating a current reducing controlling instruction for present use according to a corresponding level current reducing controlling coefficient comprises: according to a level current reducing controlling coefficient for present use, generating the present current reducing controlling instruction; and the processor to perform operations further comprise: setting a duration threshold; and the controlling to reduce all at once or reduce progressively for multiple times the value of the charging current of the wearable electronic device, so that the temperature value monitored in real time is less than or equal to the temperature lower limit value comprises:

controlling to reduce the value of the charging current of the wearable electronic device according to the present current reducing controlling instruction, so that the wearable electronic device is charged according to the current value that has been reduced;

timing from the time point when the value of the electricity charging current of the wearable electronic device is reduced, to obtain a present current reducing duration; and if when the present current reducing duration is equal to the duration threshold, the temperature value monitored in real time is still within the temperature range, according to current reducing controlling coefficients of a next level that are used in a next level, generating a current reducing controlling instruction of a next level, and controlling to continue to reduce the value of the charging current of the wearable electronic device.

13. The apparatus according to claim 12, wherein, the controlling to reduce all at once or reduce progressively for multiple times the value of the charging current of the wearable electronic device, so that the temperature value monitored in real time is less than or equal to the temperature lower limit value further comprises: if when the present current reducing duration is equal to the present duration threshold, the temperature value monitored in real time is still within the temperature range, then controlling to turn off the wirelessly receiving coil of the wearable electronic device; and the processor to perform operations further comprise: setting a current reducing time number threshold or setting a lowest value of the charging current; and if controlling to reduce progressively for multiple times the value of the charging current of the wearable electronic device, accumulating the current reducing time number, and if the accumulated current reducing time number reaches the current reducing time number threshold, and the temperature value monitored in real time is still within the temperature range, controlling to turn off the wirelessly receiving coil of the wearable electronic device; or if controlling to reduce progressively for multiple times the value of the charging current of the wearable electronic device, if the present value of the charging current is not greater than the lowest value of the charging current, and the temperature value monitored in real time is still within the temperature range, controlling to turn off the wirelessly receiving coil of the wearable electronic device.

14. The apparatus according to claim 13, wherein, the setting one or more level current reducing controlling coefficients comprises: setting a current reducing controlling coefficient of a first level, wherein the current reducing controlling coefficient of a first level is a numerical value that is less than 1;

the generating a current reducing controlling instruction for present use according to a corresponding level current reducing controlling coefficient comprises:

when the level current reducing controlling coefficient for present use is the current reducing controlling coefficient of a first level, setting a product value of the current reducing controlling coefficient of a first level and the preset constant-current charging current value in the current reducing controlling instruction for present use, to indicate that the value of the charging current after current reduction of the present level is the product value;

the setting one or more level current reducing controlling coefficients comprises: setting a current reducing controlling coefficient of a first level and a current reducing controlling coefficient of a second level, wherein the current reducing controlling coefficient of a first level and the current reducing controlling coefficient of a second level are both numerical values that are less than 1; and the according to current reducing controlling coefficients of a next level that are used in a next level, generating a current reducing controlling instruction of a next level comprises:

when the current reducing controlling coefficients of a next level that are used in a next level comprises the current reducing controlling coefficient of a first level and the current reducing controlling coefficient of a second level, setting a product value of the current reducing controlling coefficient of the second level and the current reducing controlling coefficient of the first level and the set constant-current charging current value, in the current reducing controlling instruction of a next level, to indicate that the value of the charging current after current reduction of the next level is the product value.

15. A smart watch, wherein, the smart watch is provided with the charging control apparatus for a wearable electronic device, and the apparatus for controlling charging enables a temperature value of the smart watch when being charged in a wireless mode to be within a preset temperature range;

wherein, the apparatus for controlling charging comprises a processor and at least one computer-readable storage medium, the at least one computer-readable storage medium stores computer-executable instructions which, when executed by the processor, cause the processor to perform operations comprise:

setting a temperature range when the wearable electronic device is being charged according to a user demand;

when the charging starts, turning on a wirelessly receiving coil of the wearable electronic device, and using the wirelessly receiving coil to generate a charging current for charging the wearable electronic device;

when it is monitored that a value of the charging current of the wearable electronic device rises to a set constant-current charging current value, acquiring in real time a temperature value of the wearable electronic device;

judging whether the temperature value is within the temperature range; and if yes, maintaining the present value of the charging current of the wearable electronic device; and if not, changing the value of the charging current of the wearable electronic device, and thus changing the temperature value of the wearable electronic device, so that the temperature value of the wearable electronic device is within the temperature range;

wherein the step of changing the value of the charging current of the wearable electronic device, and thus changing the temperature value of the wearable electronic device, so that the temperature value of the wearable electronic device is within the temperature range particularly comprises: when the temperature value is higher than the temperature range, reducing the value of the charging current of the wearable electronic device, and when the temperature value is below the temperature range, increasing the value of the charging current of the wearable electronic device.

16. The smart watch according to claim 15, wherein, the temperature range is the range between a set temperature upper limit value and a set temperature lower limit value; and the changing the value of the charging current of the wearable electronic device comprises:

when the temperature value of the wearable electronic device is higher than the upper limit value of the temperature range, controlling to reduce all at once or reduce progressively for multiple times the value of the charging current of the wearable electronic device, so that the temperature value monitored in real time is less than or equal to the temperature lower limit value; and, when the temperature value of the wearable electronic device is less than or equal to the lower limit value of the temperature range, controlling to increase the value of the charging current of the wearable electronic device.

17. The smart watch according to claim 16, wherein, the controlling to reduce all at once or reduce progressively for multiple times the value of the charging current of the wearable electronic device comprises:

setting one or more level current reducing controlling coefficients, and generating a current reducing controlling instruction for present use according to a corresponding level current reducing controlling coefficient; and sending the current reducing controlling instruction to a processing chip that controls the wirelessly receiving coil, to cause the processing chip to reduce a voltage numerical value of a current and power pin, thereby reducing the value of the charging current of the wearable electronic device.

18. The smart watch according to claim 17, wherein, the generating a current reducing controlling instruction for present use according to a corresponding level current reducing controlling coefficient comprises: according to a level current reducing controlling coefficient for present use, generating the present current reducing controlling instruction; and the processor to perform operations further comprise: setting a duration threshold; and the controlling to reduce all at once or reduce progressively for multiple times the value of the charging current of the wearable electronic device, so that the temperature value monitored in real time is less than or equal to the temperature lower limit value comprises:

controlling to reduce the value of the charging current of the wearable electronic device according to the present current reducing controlling instruction, so that the wearable electronic device is charged according to the current value that has been reduced;

timing from the time point when the value of the electricity charging current of the wearable electronic device is reduced, to obtain a present current reducing duration; and if when the present current reducing duration is equal to the duration threshold, the temperature value monitored in real time is still within the temperature range, according to current reducing controlling coefficients of a next level that are used in a next level, generating a current reducing controlling instruction of a next level, and controlling to continue to reduce the value of the charging current of the wearable electronic device.

19. The smart watch according to claim 18, wherein, the controlling to reduce all at once or reduce progressively for multiple times the value of the charging current of the wearable electronic device, so that the temperature value monitored in real time is less than or equal to the temperature lower limit value further comprises: if when the present current reducing duration is equal to the present duration threshold, the temperature value monitored in real time is still within the temperature range, then controlling to turn off the wirelessly receiving coil of the wearable electronic device; and the processor to perform operations further comprise: setting a current reducing time number threshold or setting a lowest value of the charging current; and if controlling to reduce progressively for multiple times the value of the charging current of the wearable electronic device, accumulating the current reducing time number, and if the accumulated current reducing time number reaches the current reducing time number threshold, and the temperature value monitored in real time is still within the temperature range, controlling to turn off the wirelessly receiving coil of the wearable electronic device; or if controlling to reduce progressively for multiple times the value of the charging current of the wearable electronic device, if the present value of the charging current is not greater than the lowest value of the charging current, and the temperature value monitored in real time is still within the temperature range, controlling to turn off the wirelessly receiving coil of the wearable electronic device.

20. The smart watch according to claim 19, wherein, the setting one or more level current reducing controlling coefficients comprises: setting a current reducing controlling coefficient of a first level, wherein the current reducing controlling coefficient of a first level is a numerical value that is less than 1;

the generating a current reducing controlling instruction for present use according to a corresponding level current reducing controlling coefficient comprises:

when the level current reducing controlling coefficient for present use is the current reducing controlling coefficient of a first level, setting a product value of the current reducing controlling coefficient of a first level and the preset constant-current charging current value in the current reducing controlling instruction for present use, to indicate that the value of the charging current after current reduction of the present level is the product value;

the setting one or more level current reducing controlling coefficients comprises: setting a current reducing controlling coefficient of a first level and a current reducing controlling coefficient of a second level, wherein the current reducing controlling coefficient of a first level and the current reducing controlling coefficient of a second level are both numerical values that are less than 1; and the according to current reducing controlling coefficients of a next level that are used in a next level, generating a current reducing controlling instruction of a next level comprises:

when the current reducing controlling coefficients of a next level that are used in a next level comprises the current reducing controlling coefficient of a first level and the current reducing controlling coefficient of a second level, setting a product value of the current reducing controlling coefficient of the second level and the current reducing controlling coefficient of the first level and the set constant-current charging current value, in the current reducing controlling instruction of a next level, to indicate that the value of the charging current after current reduction of the next level is the product value.

* * * * *